United States Patent
Topinka

[15] 3,656,504
[45] Apr. 18, 1972

[54] BURIED VALVE POSITION INDICATOR
[72] Inventor: George F. Topinka, Oak Brook, Ill.
[73] Assignee: Henry Pratt Company
[22] Filed: Feb. 27, 1970
[21] Appl. No.: 15,056

[52] U.S. Cl..............................137/363, 74/801, 137/553
[51] Int. Cl.........................................F16k 1/28, F16k 37/00
[58] Field of Search..................116/125; 137/363, 364, 368, 137/371, 551, 553; 74/801

[56] References Cited

UNITED STATES PATENTS

| | | | |
|---|---|---|---|
| 2,401,875 | 6/1946 | Lawler | 74/801 |
| 2,984,127 | 5/1961 | Schwenk | 74/801 |
| 3,081,648 | 3/1963 | Duer | 74/801 |
| 2,456,814 | 12/1948 | Church | 74/801 UX |
| 2,579,796 | 12/1951 | Church | 74/801 UX |

FOREIGN PATENTS OR APPLICATIONS 741,777 12/1955 Great Britain........................116/125

Primary Examiner—Henry T. Klinksiek
Attorney—Hofgren, Wegner, Allen, Stellman & McCord

[57] ABSTRACT

A valve position indicator for buried valves having a rotatable operator shaft extended to ground level. A pipe upright is positioned about the operator shaft and extends to ground level. An indicator housing is non-rotatably mounted in the pipe near ground level and a bearing engages the housing and the operator shaft for transferring side loads from the shaft through the housing to the pipe. A self-contained, sealed indicating gear box unit is slidably mounted over the upper end of the extended operator shaft, with a driving gear rotatably coupled with the operator shaft. The gear box has an outer portion coupled with the the housing, locking the gear box non-rotatably to the housing. The gear box unit has an interior indicia carrying gear movable circumferentially about the gear box less than 360° for multiple turns of the operator shaft, and the gear box has an outer top cover having stationary indicia positionable relative to the indicia carrying gear so as to be indicative of open and closed positions of the valve, the top cover being transparent to permit visual observation therethrough of the relative position of the interior indicia carrying gear.

6 Claims, 5 Drawing Figures

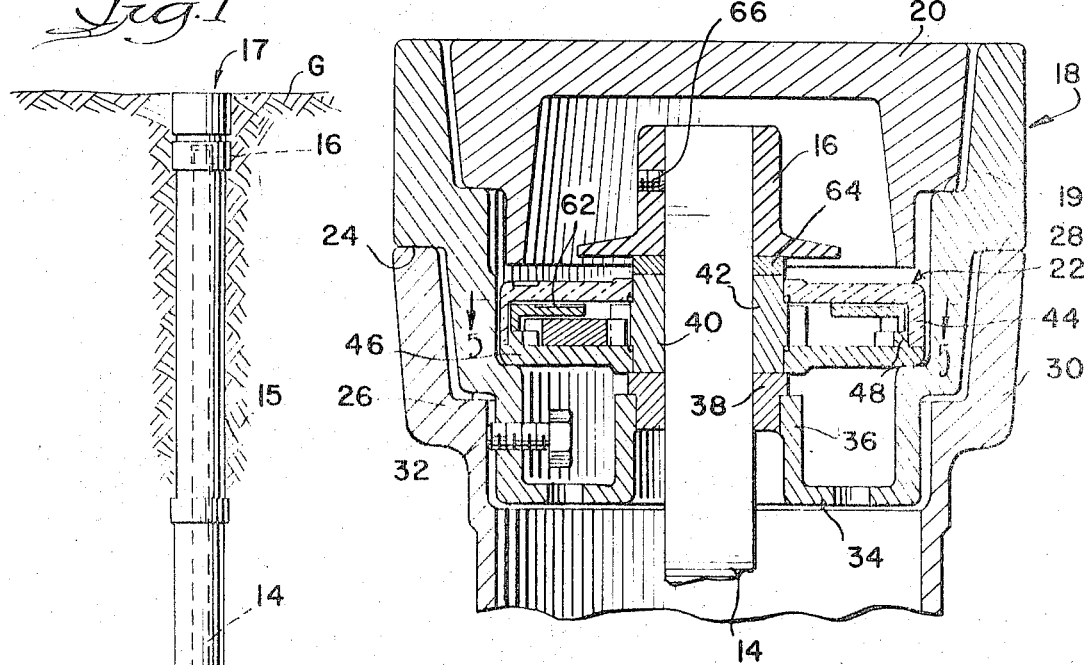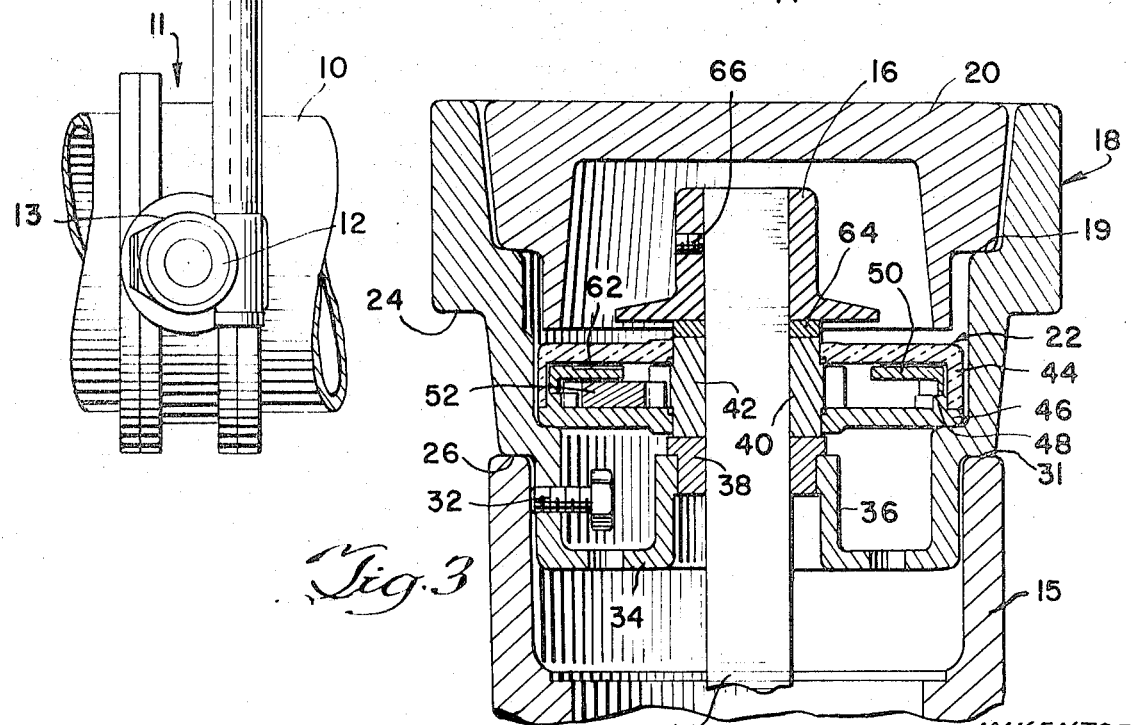

3,656,504

BURIED VALVE POSITION INDICATOR

BACKGROUND AND SUMMARY OF THE INVENTION

This invention relates to a valve operator and position indicator and more particularly to a position indicating transmission unit which may be placed upon the end of an existing valve operating shaft particularly where the valve itself is inaccessible.

In many waterwork systems there are valves in lines which are inaccessible because of being buried or in other locations out of reach of workmen. Valves in distribution lines are generally below ground and an operating shaft for the valve is carried up to the ground level inside a pipe housing or upright. A cover on the housing may be removed to expose the upper end of the shaft for the reception of a key by which the shaft may be turned as the valve is thusly opened or closed. Without a valve position indicating means, the valve operating shaft is turned manually and the workman "feels" whether or not he has turned the shaft sufficiently to open or close the valve as the case might be. The resistance to turning varies at the extreme positions of the valve in relation to the resistance to turning intermediate the positions. Such a manual "feel" procedure results in damage to some valves when the assumption arrived at is wrong, but the procedure generally is followed in the absence of a satisfactory operating procedure.

The introduction and more extensive use of butterfly valves in waterwork systems has complicated the problem since such valves turn quite easily and have very little of the "feel" at the extreme positions of the valve. Workmen accustomed to opening and closing other kinds of valves have caused damage to butterfly valves because of the absence of this "feel" which told them when the valve had reached its desired position.

The primary object, therefore, of this invention is to provide a new and improved combination valve operator and position indicator.

Another object of the invention is to provide an indicator for valve position which may be installed on the accessible portion of a valve operating shaft. The valve operator and position indicator may be mounted in an accessible position so that removal of its cover may expose both the valve operating shaft and an indicator driven therefrom. The indicator can be turned through less than 360° by a valve operating shaft which may be required to make many turns to move the valve between its extreme positions.

A further object of the invention is to provide a new and improved buried valve position indicating unit for use with rotary valve operated buried valves, with the operator shaft extended to near ground level, wherein the unit includes a self-contained, sealed indicating gear box unit slidingly mounted over the upper end of the extended operator shaft. The gear box unit has an interior indicia carrying gear and an outer indicating cover which is transparent to permit visual observation therethrough of the relative position of the interior indicating gear.

In the embodiment of the invention shown herein, the gear box unit is positioned in an indicator housing having a bearing engaging the operator shaft for transferring side loads from shaft to housing. The housing is secured non-rotatably relative to the buried valve. Normally, a pipe upright extends over the operator shaft to near ground level. The indicator housing is designed to be positionable within the top of the pipe upright and non-rotatably mounted relative thereto in the pipe near ground level. Therefore, the bearing engages the housing and operator shaft for transferring side loads from the shaft and through the housing to the pipe. A nut is mounted on the top of the shaft above the gear box unit for receiving applied torque through the operator shaft to the valve operator.

Other objects, features and advantages of the present invention will be apparent from the following detailed description taken in connection with the accompanying drawings.

DESCRIPTION OF THE DRAWINGS

FIG. 1 is a fragmentary broken elevational view of a buried valve having the invention mounted thereon;

FIG. 2 is a broken elevational view in section of a preferred form of the combined operator and position indicating device mounted within a valve box;

FIG. 3 is a broken elevational view in section, similar to that of FIG. 2, with the combined operator and position indicating device mounted on top of a soil pipe;

DETAILED DESCRIPTION OF THE INVENTION

Figure 4:
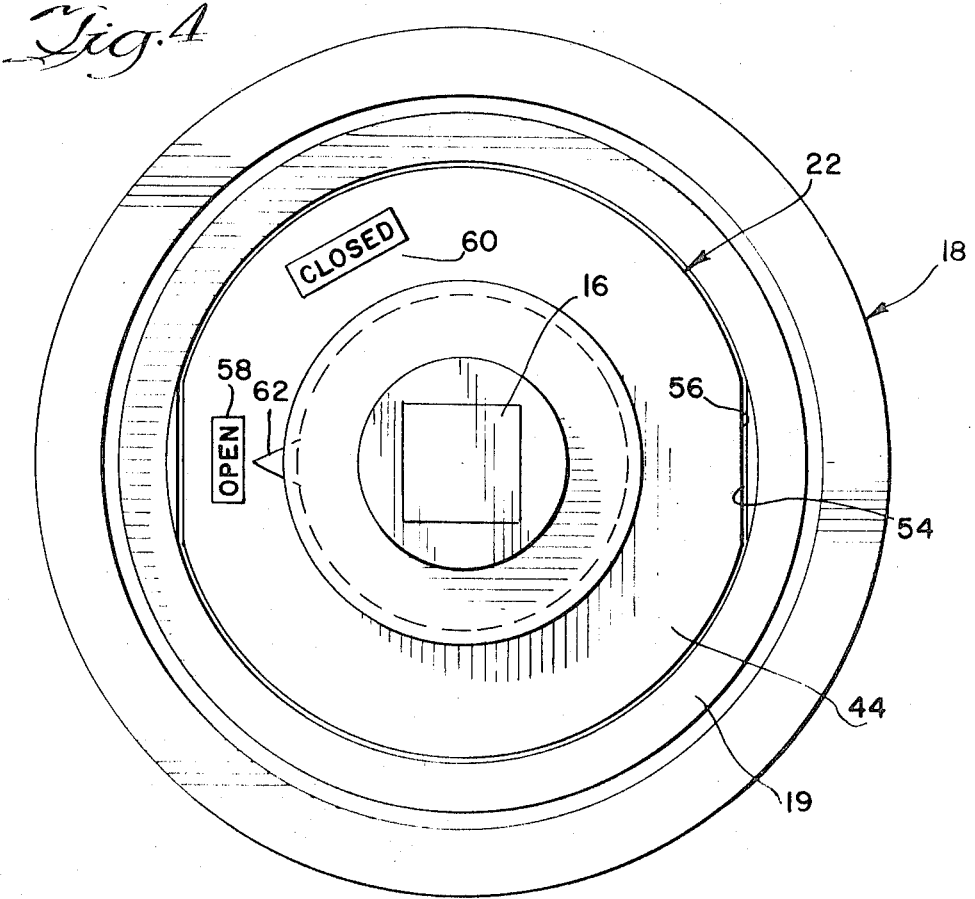
FIG. 4 is a top plan view, on an enlarged scale, of the unit with its cover removed.

The problem of indicating the position of a valve which is buried and thus inaccessible may be illustrated with reference to FIG. 1. A pipeline 10 below the ground level G has a butterfly type valve 11 mounted therein and has a shaft 12 upon which is mounted a gear box 13 in order to turn the shaft through approximately 90° to open or close the valve. The valve is opened or closed by turning the gears in the gear box. For this purpose, an operating shaft extension 14 extends upwardly from the gear box within an iron pipe upright or housing 15 to a location generally near the ground surface. The upper end of the shaft is provided with a standard square nut 16 for the reception of a socket type of key.

The valve position indicator and operator 17 of this invention is mounted on top of the pipe upright 15 and is connected with the valve operating shaft extension 14. With the use of the present position indicator, a workman does not have to make any assumptions as to the position of the inaccessible valve. Ordinarily, the unit of this invention is provided with a cover which, when removed, will expose the unit upon which the key may be placed and also will expose the position indicator.

The unit itself has a circular indicator housing 18 with an upper interior ledge 19 for receiving a cover 20. When the cover is removed, the interior of the unit has an appearance as illustrated in FIG. 4. A standard American Water Works square nut 16 for turning the valve is fully exposed for the reception of a key. As will be described in greater detail hereinafter, a self-contained, sealed indicating gear box unit, generally designated 22, has a pair of relatively movable members defining indicia as shown in FIG. 4 indicative of open and closed positions of the valve. One of the members is stationary and the other member is caused to move arcuately or circumferentially of the gear box unit 22, about the center operating shaft 14 extending through the gear box unit generally centrally thereof, as the valve is either opened or closed. In the embodiment illustrated herein, the movable indicating member will move only four or five degrees for each complete turn of the operator shaft 14 whereby the buried valve may receive multiple turns of the operating shaft 14 to move the indicator means less than 360°.

Referring to FIGS. 2 and 3, the indicator housing 18 has a pair of downwardly facing shoulders 24 and 26 on the exterior side walls thereof. The upper shoulder 24 is designed for seating on the top ledge 28 (FIG. 2) of a valve box 30, commonly called a "Buffalo" box. For instance, a standard 5¼ in. valve box might be appropriate. The lower shoulder 26 is of a size to fit on the top ledge 31 (FIG. 3) of a soil pipe (for instance, a 5 in. soil pipe as compared with the 5½ in. valve box shown in FIG. 2). A bolt 32 is threadably received in the lower portion of the indicator housing 18 with the head of the bolt on the inside thereof. The bolt is threadable into engagement with the inside of either the valve box 30 (FIG. 2) or the top of the soil pipe 15 (FIG. 3) to secure the indicator housing 18 non-rotatably relative to the pipe 15 and thus the buried valve 11. The indicator housing has an inwardly extending portion 34 terminating in an upwardly extending cylindrical portion 36 on which is seated a bearing 38 whereby the bearing engages the indicator housing 18 and the operator shaft 14 for transferring side loads from the shaft, through the housing 18, to the pipe 15.

Figure 5:
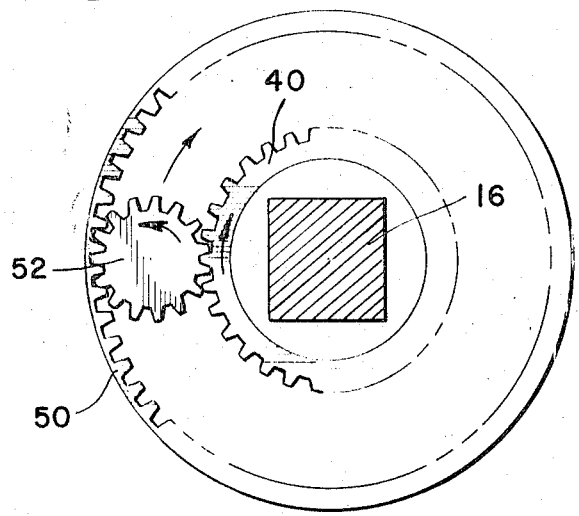
FIG. 5 is a fragmentary sectional view taken substantially along the line 5—5 of FIG. 2.

The self-contained, sealed gear box unit 22 has a transmission mechanism mounted about the operator shaft 14 to effectively move the indicating means, to be described in greater detail hereinafter, less than one turn for many turns of the shaft itself. In the embodiment illustrated in FIGS. 2, 3 and 5, this mechanism includes a center driving pinion gear 40 with a central, square or rectangular opening 42 therethrough to receive the shaft 14 and turn with the shaft. The gear box unit 22 has upper and lower stationary annular parts 44 and 46, respectively, peripherally sealed to each other and movably sealed to the center drive pinion gear 40. The upper stationary annular part 44 comprises a cover for the gear box unit. The lower stationary annular part 46 has a ring gear portion 48. An indicating ring gear 50 is positioned beneath the upper annular part 44 and is movable circumferentially of the gear box unit 22. The train of the drive from the center driving pinion gear 40 is through an intermediate idler gear 52 which is disposed between and in mesh with the pinion gear 40 and the outer ring gears 48 and 50.

In operation of the transmission mechanism described above, as the nut 16 on top of the shaft 14 is turned, the center drive pinion gear 40 is caused to rotate with the shaft. With the drive pinion gear 40 in mesh with the idler gear 52, the idler gear is caused to revolve around the interior of the gear box unit, with the idler gear 52 in mesh with the stationary ring gear portion 48 of the lower stationary annular part 46 and in mesh with the movable indicating ring gear 50. The indicating gear 50 has one more tooth than the stationary ring gear 48, both of which are in mesh with the idler gear 52. Therefore, as the idler ear makes one complete orbit around the inside of the stationary ring gear 48, it will cause the indicating gear 50 to revolve one tooth. Thus, for each two revolutions of the drive pinion gear 40, the indicator gear moves one tooth in the same direction as the idler gear 52 is orbited.

Referring to FIG. 4, the indicator housing 18 has flat vertical interior wall portions 54 and the gear box 22 has flat vertical complementary side walls 56 to mount the gear box unit 2 within the housing 18 non-rotatably.

Again referring to FIG. 4, the upper stationary annular part or cover 44 of the gear box unit 22 is made of transparent material and has "open" and "closed" labels 58 and 60, respectively, cemented to the inside surface thereof. The indicating gear 50, disposed beneath the transparent cover has an indicating pointer 62 on its upper surface. Thus, with the indicating gear and the pointer 62 being visible through the transparent cover 44, the pointer 62 will indicate the position of the valve to which the position indicating gear 50 is operatively connected through the idler gear 52, the center drive pinion gear 40 and the shaft 14.

In assembly, the operator housing 18 simply is positioned on top of and partially within either a valve box 30 (FIG. 2) or the top of a pipe housing 15 (FIG. 3). The bolt 32 then is threadably tightened against the inside of the valve box or pipe housing so that the bearing 38 engages the housing and the shaft 14 for transferring side loads from the shaft through the housing to the pipe. Once the housing 18 is tightened in position, the self-contained, sealed gear box unit 22 is positioned over the shaft 14 with the shaft extending through the center opening 42 in the drive pinion gear 40. A bearing washer 4 (FIGS. 2 and 3) may be positioned over the shaft on top of the drive pinion gear 40. The nut 21 is then positioned on top of the shaft 14 and a screw key 66 (FIGS. 2 and 3) may be turned to fix the nut on top of the shaft. The top cover 20 then is positioned on top of the housing. Obviously, if the valve is closed or opened at the time of assembling the valve position indicator and operator of this invention, the pointer 62 initially must be properly indicating that initial position.

The foregoing detailed description has been given for clearness of understanding only and no unnecessary limitations should be understood therefrom as some modifications will be obvious to those skilled in the art.

I claim:

1. A valve position indicator for buried valves having a rotatable operator shaft extended to ground level, comprising:
   an indicator housing having a bearing engaging the shaft and the housing for transferring side loads from shaft to the housing;
   means securing the housing non-rotatably relative to the buried valve;
   a sealed gear box indicator having a central opening slidably receiving the shaft endwise and a driving gear in said opening rotatably coupled with the shaft, said indicator having an outer portion coupled with the housing locking the indicator non-rotatably to the housing; and
   means removably mounted on the housing for access to the shaft at ground level for rotating the shaft to open and close the valve while the indicator gear box receives rotatable input from the shaft without side thrust applied thereto.

2. A valve position indicator as specified in claim 1 wherein the gear box indicator has a center gear comprising said driving gear with an opening therethrough to receive the shaft, said gear box having upper and lower stationary annular parts peripherally sealed to each other and movably sealed to said center gear.

3. A valve position indicator as specified in claim 2 wherein the upper annular part is transparent and carries stationary indicia indicative of open and closed positions of the valve when a movable gear indicia is in register with such stationary indicia.

4. A buried valve position indicator for use with a rotary shaft operated buried valve with an operator shaft extended to near ground level, comprising:
   a self-contained, sealed indicating gear box unit slidably mounted over the upper end of the extended operator shaft,
   the gear box unit having an interior indicating member movable relative to an outer top indicating member as the shaft turns,
   the top indicating member being transparent to permit visual observation therethrough of the relative position of the interior indicating member, and
   means holding the gear box unit from turning as the shaft turns.

5. A valve position indicator as specified in claim 4 wherein the gear box unit has an input gear rotatable with the valve operator shaft and said interior indicating member comprises an indicia carrying gear movable circumferentially of the gear box approximately four to five degrees for each complete turn of the input gear whereby a buried valve may receive multiple turns of its operating shaft to move the indicator less than 360°.

6. A valve position indicator for a buried valve having an operator with an upright rotatable input shaft for effecting valve opening and closing, comprising in combination:
   a pipe upright over the input shaft to near ground level;
   an extension shaft operatively connected to the input shaft and extending up through the pipe upright to near ground level;
   an indicator housing mounted non-rotatably relative to and in the pipe near ground level;
   a bearing engaging both said housing and said extension shaft for transferring side loads from the shaft through the housing to the pipe;
   a sealed position indicating gear box slidably mounted over the upper end of and in driven relation with said extension shaft and non-rotatably seated in said housing whereby rotation of said extension shaft effectively operates said indicating gear box, and indicia on the gear box indicative of valve positions; and
   a nut secured on the shaft above the indicating gear box for receiving torque applied thereto and through the extension shaft to the valve operator.

* * * * *